June 26, 1923.
G. A. HALLAUER
1,460,241
GASOLINE FILTER FOR MOTOR DRIVEN VEHICLES
Filed Oct. 2, 1920
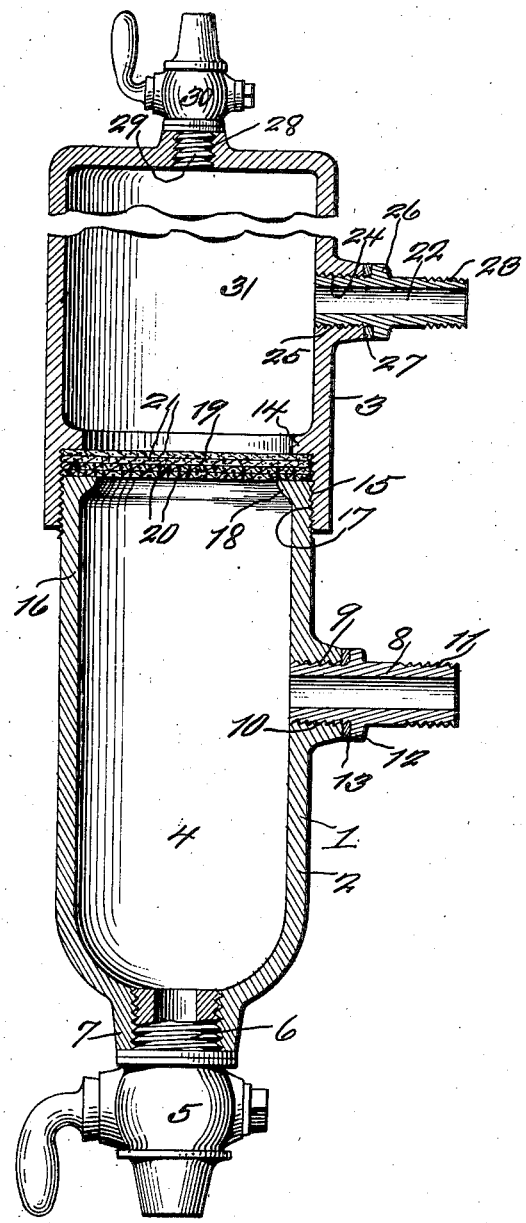
George A. Hallauer INVENTOR.
BY
Watson E. Coleman
ATTORNEY.

Patented June 26, 1923.

1,460,241

UNITED STATES PATENT OFFICE.

GEORGE A. HALLAUER, OF GROVER, SOUTH DAKOTA.

GASOLINE FILTER FOR MOTOR-DRIVEN VEHICLES.

Application filed October 2, 1920. Serial No. 414,232.

*To all whom it may concern:*

Be it known that I, GEORGE A. HALLAUER, a citizen of the United States, residing at Grover, in the county of Codington and State of South Dakota, have invented certain new and useful Improvements in Gasoline Filters for Motor-Driven Vehicles, of which the following is a specification, reference being had to the accompanying drawings.

The present invention has for its purpose the provision of a filter for filtering gasoline during its passage to the carburetor.

Furthermore, the invention embodies a chamber for retaining the impurities of the gasoline, such as dirt, water and the like, with filtering means at the top of the chamber for preventing the passage of the impurities, dirt and water into the passage of the carburetor, thereby not only avoiding carburetor trouble, but also providing a much better fuel, which will result in a far superior mixture.

Still further, it is the aim to provide means at the lower end of the reservoir for draining off the impurities, such as dirt, water and the like, and which means at the bottom of the reservoir together with means such as a pet cock at the top of the filter casing above the filtering means proper may be manipulated for the purpose of cleaning the filtering means, such as screens and layers of chamois skin.

Additionally the invention aims to provide a very simple, efficient and practical filter, wherein a casing consisting of two sections is provided, there being means adjacent where the two sections connect, for holding the filtering means in place, such means also acting to hold the filtering elements on the closure adjacent to each other or permit them to lie in more or less spaced relation to each other.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed, In the drawing there is illustrated a single view of the filter, which comprises a suitable casing 1, which may be any shape or configuration, preferably as shown. This casing comprises two sections 2 and 3. The section 2 may be any suitable proportions, preferably as shown, and its chamber 4 constitutes a receiver for the gasoline. The impurities, such as dirt, water and the like are retained in the chamber 4, therefore this chamber acts as a trap for the impurities. A suitable pet cock 5 has its extension 6 threaded into the extension 7 of the lower end of the section 2 of the casing. By means of this pet cock the impurities, such as dirt, water and the like may be drained off from the chamber 4.

A suitable coupling 8 has its threaded portion 9 threaded into the flanged opening 10 of the section 2 of the casing, and has its other end threaded at 11. The threaded end 11 may be connected to any suitable gasoline conduit or pipe from any suitable source (not shown), for conveying gasoline into the chamber 4. The coupling 8 has an annular flange 12, between which and the end of the flange of the opening 10 a suitable washer 13 is interposed, so as to insure a tight connection with the section 2 of the casing. The inner circumference of the section 3 adjacent its lower open end is provided with an annular flange 14, and adjacent the flange, the inner circumference of the section 3 is provided with threads 15. The end portion 16 of the section 2 of the casing has exterior threads 17, which engage the threads 15. Also the open end of the section 2 has an internal flange 18. This flange 18 protrudes further inwardly than the flange 14, in view of the fact that the section 2 is threaded in the section 3. It is obvious that this construction may be reversed, namely, the section 3 may be threaded into the section 2. Interposed between the margin of the open end 16 of the section 2 and the flange 14 are suitable filtering means 19, which comprises one or more wire fabric disks 20 and one or more chamois skin disks 21. These disks are clamped securely together by being interposed between the flanged open end of the section 2 of the casing and the flange 14. It will be noted that the two sections 2 and 3 of the casing may be adjusted toward or from each other, by reason of the threaded connections, and thus the filtering disks be held either clamped tightly together or loosely clamped to thereby in a degree control the action of the filtering disks. The gasoline filters through the filtering members, and then pass out through the coupling 22, to the threaded end 23 of which, a suitable tube, pipe or like (not shown) from the carburetor (not shown) may be connected. The coupling 22 has its end 24 threaded into the flanged opening 25 of the section 3 of the casing. The coupling 22 has an annular collar 26, between which and the flange of the opening 25, a washer 27 is interposed, to insure a fuel tight connection.

The upper end of the section 3 of the casing has a flange opening 28, which is interiorly threaded, to be engaged by the threaded extension 29 of the air cock 30, to be used when cleaning the filtering screens or members. In order to clean the filtering device, the pet cock 5 may be opened to admit air to the interior of the upper section and thus pure gasoline may be drained from the chamber 31 of the section 3 of the casing through the filtering means, and through the reservoir 4, hence causing the washing out of the impurities, which may drain off through the pet cock 5. In the operation, the filtering device is connected to the usual gasoline supply by means of the coupling 8, and to the carburetor by means of the coupling 22. The gasoline enters the chamber 4, and filters through the filtering means 19, the pure fuel then passes through the coupling 22 to the carburetor.

The invention having been set forth, what is claimed as being useful is:—

1. In a filtering device, a casing comprising upper and lower axially aligned sections, the former threaded over the latter and provided with an internal flange at the terminal of its threads, the marginal edge of the latter having an internal flange, filtering means clamped between the internal flanges of both sections and comprising lower discs of wire fabric, and upper circular pieces of chamois skin, said discs and chamois skin pieces being immediately adjacent each other and superimposed, means for connecting the upper section to a carburetor, an air pet cock for the upper section, a drain pet cock connected to the lower end of the lower section, the lower portion of the inner wall of the lower section curving into the passage of the pet cock to insure carrying off sediment, and means connected to the lower section at a point a substantial distance above the drain pet cock for connection with a gasoline supply.

2. In a filtering device, a casing comprising axially united sections, one section having an air pet cock and provided with means for operative connection with the carburetor, the other section having a drain pet cock and being provided with means for operative connection with a gasoline supply, filtering means adjacent the united portions of said sections, which portions have clamping means for said filtering means, the filtering means comprising corresponding complemental discs of wire fabric and chamois skin pieces, the former being immediately below the latter to support the central portions of the chamois skin pieces, thereby preventing such central portions sagging and also preventing the chamois skin from pulling from between the clamping means.

In testimony whereof I hereunto affix my signature.

GEO. A. HALLAUER.